UNITED STATES PATENT OFFICE.

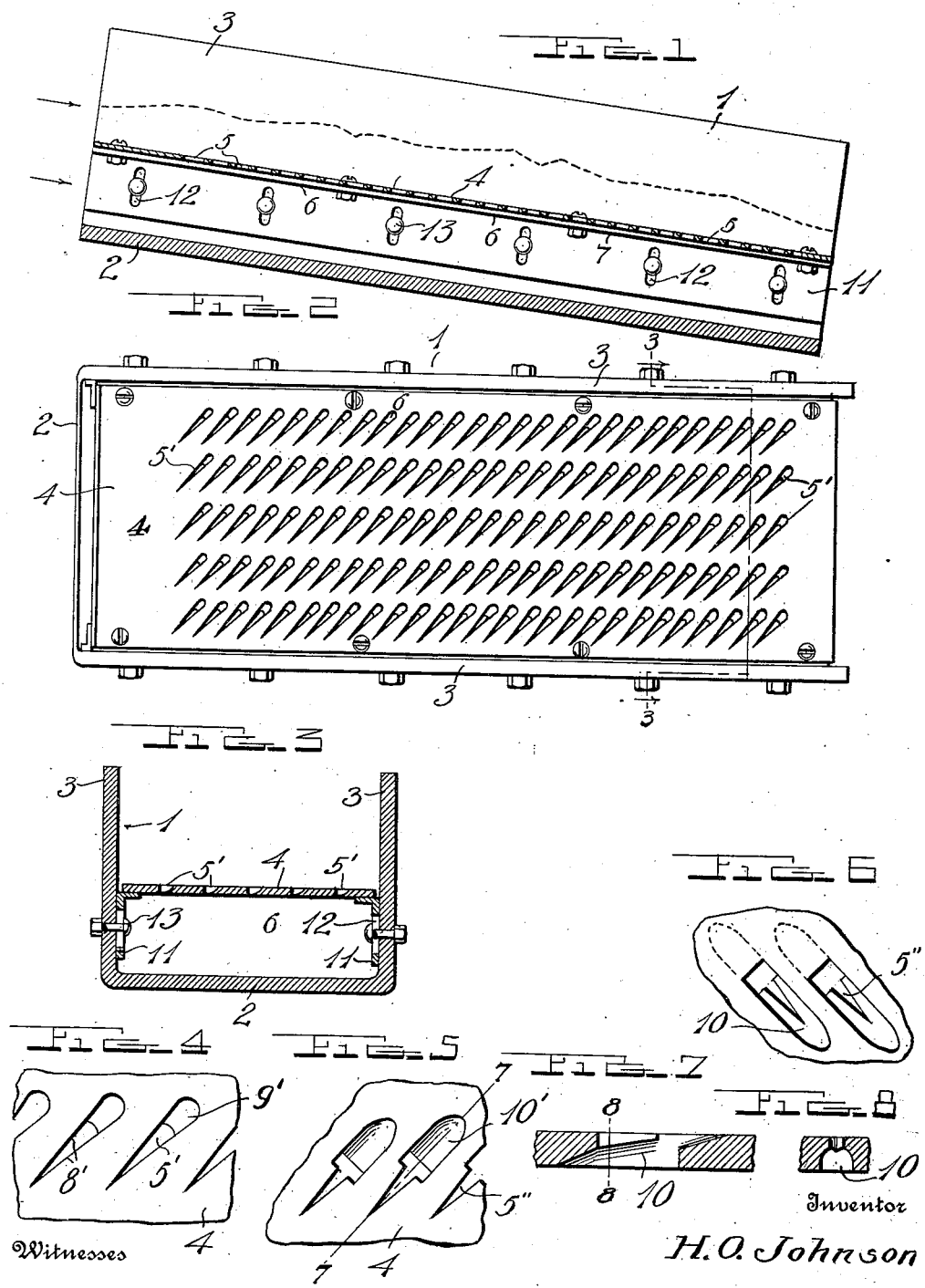

HENRY O. JOHNSON, OF BUDA, ILLINOIS.

APPARATUS FOR WASHING AND SEPARATING SAND, ORE, AND THE LIKE.

1,086,183.    Specification of Letters Patent.    Patented Feb. 3, 1914.

Application filed September 18, 1912. Serial No. 721,085.

*To all whom it may concern:*

Be it known that I, HENRY O. JOHNSON, a citizen of the United States, residing at Buda, in the county of Bureau and State of Illinois, have invented certain new and useful Improvements in Apparatus for Washing and Separating Sand, Ore, and the like; and I do declare the following to be a full, clear, and exact description of the invention, such as will enable others skilled in the art to which it appertains to make and use the same.

This invention relates to an apparatus for washing and separating sand and gravel and freeing gravel from foreign matter.

One object of the invention is to provide a separator of this character by means of which sand and gravel may be speedily and economically washed and thoroughly separated and the gravel freed from impurities and foreign matter such as clay, flour, sand and the like.

Another object is to provide a separator in the form of a flume which will be simple, durable and inexpensive in construction, efficient and reliable in operation and to which the material may be fed in any suitable manner and acted on by a current of water passing through the flume.

With these and other objects in view, the invention consists of certain novel features of construction and the combination and arrangement of parts, as will be more fully described and claimed.

In the accompanying drawings: Figure 1 is a central vertical longitudinal section of one form of my improved separator; Fig. 2 is a top plan view thereof; Fig. 3 is a vertical cross sectional view thereof; Fig. 4 is a detail plan view thereof; Fig. 5 is a similar view of still another form; Fig. 6 is a bottom plan view of the form shown in Fig. 5; Fig. 7 is a vertical section taken on the line 7—7 of Fig. 5; Fig. 8 is a vertical section taken on the line 8—8 of Fig. 7.

In this improved apparatus a stream of water is caused to flow in the same direction both above and below a suitable screen, whereby the sediment, mud, sand or other fine particles will fall through the screen and be carried off by the lower sheet of water while the gravel or larger particles will travel down the top of the screen to be thoroughly washed and separated from the sand or refuse.

The improved separator shown in Figs. 1 to 5 comprises a flume 1 which may be constructed of any suitable material and of any suitable size and in the embodiment illustrated comprises a channel-shaped body having a bottom 2 and vertical sides 3 which may be of any desired width. The body of the flume is open at its ends and arranged therein and adjustably secured to the sides thereof is a false screen bottom 4 formed from any suitable material, a thick metal or a wooden plate being here shown. This false screen bottom 4 is provided with elongated openings 5 preferably arranged in parallel rows disposed obliquely and parallel with each other in the rows with the reduced ends thereof extending toward the upper or inlet end of the flume as is shown clearly in Fig. 2.

In the form shown in Figs. 5 to 8 the lower face of the bottom 4 is undercut or scooped out around the slots 5″ therein as shown at 10, the end walls 10′ adjacent the reduced ends of the slots on the lower face being inclined or undercut to facilitate the free passage of the material through the slots.

In the form shown in Fig. 4 triangular slots 5′ are provided at their lower ends with beveled walls which form inclined mouths 8′. The lower edges of the lower larger ends of these slots 5′ are beveled or inclined as clearly shown at 9′ to prevent the material being treated from catching and lodging in the lower ends of said slots.

In the preferred form of the invention shown in Figs. 1, 2, 3 and 5 to 8 the elongated apertures have their opposite ends beveled on opposite faces of the bottom 4 which facilitates the free passage of the sand and impurities through said openings without any danger of clogging of the openings.

In the operation of the separator the flume is preferably supported or arranged to have a fall or inclination of from one-half to two inches per lineal foot to impart the desired velocity to the stream of water passing through the same. The water is turned into the upper end of the flume in a stream of the desired volume and in passing through the flume the water fills the space below the false screen bottom 4 and to a depth of from one to two inches more or less above the bottom 4, according to the character and condition of the material being washed, the water flowing both above and below the screen bottom 4. The material to be washed and separated is also deposited in the higher end of the flume on the screen bottom 4 where the material receives the force of the water and is carried thereby downwardly across the false bottom, such parts of the material as pass through the screen being carried along by the water over the main bottom of the flume as will be readily understood. The material in thus being carried over the screen bottom 4 by the water has the finer parts and impurities therein washed and separated therefrom, these smaller parts and impurities passing through the slots in the screen bottom 4. The material may be fed or discharged into the upper end of the flume by hand or in any suitable manner and the washed and separated material is caught and conveyed by any suitable apparatus to any desired place of deposit.

By means of a flume constructed in accordance with my invention it will be seen that ores, sand, gravel, coal and the like may be washed and thoroughly separated solely by the action of the current of water passing through the flume.

I claim as my invention:

In a separator of the class described, a flume having a false bottom provided with rows of parallel elongated apertures with their opposite ends beveled on opposite faces of the bottom and with their reduced ends extending toward the inlet end of the flume.

In testimony whereof I have hereunto set my hand in presence of two subscribing witnesses.

HENRY O. JOHNSON.

Witnesses:
L. O. HILTON,
GEORGE GROVANNETTI.

---

Copies of this patent may be obtained for five cents each, by addressing the "Commissioner of Patents, Washington, D. C."